United States Patent [19]

Behnke

[11] 4,150,488

[45] Apr. 24, 1979

[54] CHAIN WEAR INSPECTION GAUGE

[75] Inventor: Edward R. Behnke, Lockport, N.Y.

[73] Assignee: Columbus McKinnon Corporation, Tonawanda, N.Y.

[21] Appl. No.: 869,094

[22] Filed: Jan. 13, 1978

[51] Int. Cl.$^2$ .......................... G01B 3/38; G01B 5/08

[52] U.S. Cl. ................................ 33/168 R; 33/178 B

[58] Field of Search ............ 33/168 R, 168 B, 174 K, 33/178 B

[56] References Cited

U.S. PATENT DOCUMENTS

| | | | |
|---|---|---|---|
| 1,389,486 | 8/1921 | Brewer | 33/168 R |
| 1,638,885 | 8/1927 | Shea | 33/168 R |
| 2,471,961 | 5/1949 | Jones | 33/178 B |
| 3,100,939 | 8/1963 | Blaiklock et al. | 33/174 K |

FOREIGN PATENT DOCUMENTS

| | | | |
|---|---|---|---|
| 227381 | 1/1925 | United Kingdom | 33/168 R |

*Primary Examiner*—Richard R. Stearns

*Attorney, Agent, or Firm*—Bean, Kauffman & Bean

[57] ABSTRACT

A bent wire link type chain wear inspection apparatus for measuring the section thickness of a chain link to determine the limit of permissible wear thereof comprising a device (1) having a plurality of slots (5–14) therein uniquely identified with respect to chain size and used to establish the continued serviceability of chains from a wear standpoint. Each of the slots has an opening smaller than the identified chain size and which is preferably equal to the minimum acceptable link section size. Acceptable chain links are therefore excluded from fitting into the opening whereas worn chain links which have been worn to a degree which equals or exceeds the limit of permissible wear slide into the opening thereby indicating that the chain should be removed from service.

2 Claims, 2 Drawing Figures

CHAIN WEAR INSPECTION GAUGE

SPECIFICATION OF TECHNICAL FIELD

The present invention relates to the technical field of measuring instruments for determining acceptable wear limits of chains. Specifically, the present invention relates to a chain wear inspection gauge useful for determining when a chain link has been worn to such a degree that replacement is required in order to assure continued safe operation.

DESCRIPTION OF THE BACKGROUND

It is well known that in industrial operation, chains and specifically chain links undergo wear so that the original section thickness of the chain link becomes reduced. Excessive reduction of this original nominal wire diameter renders the chain unsafe so that such a chain or chain link should be removed from service. Various devices have been previously designed for determining the nominal, unworn diametral size of various items such as round stock and drills as exemplified by U.S. Pat. Nos. 1,881,651; 2,981,005; 3,381,385; 1,860,174; and 1,389,486. All of these patents are directed to measuring the unworn nominal size for the purpose of determining the original size of the article as opposed to determining the point at which the nominal size has been unsatisfactorily reduced in dimension.

U.S. Pat. No. 1,638,885 discloses a safety appliance gauge which includes a body of sheet material having slots formed therein for the purpose of determining whether or not certain specific safety related components on railway trains are of less than safe proportions. The slots formed in this gauge, however, have openings which are exactly equal to the dimensions of the respective components to be measured. The inspector using the gauge determines when a measured component has an unacceptably reduced dimension by detecting the existance of play between the two edges of the slots and the measured component. The disclosed apparatus and technique are, however, undesirable in that they require the inspector's judgement since a small degree of play always exists in order to permit the gauge to fit over the measured component in the first instance. Furthermore, the disclosed gauge is not adapted to accommodate or give a measure of the factor of safety which is initially incorporated in all such safety related components. Thus, the technique for using the disclosed gauge does not permit wear of any of the components even though they initially include an initial factor of safety.

SUMMARY OF THE INVENTION

Accordingly, there is herein disclosed an inspection gauge which permits the precise determination of the wear characteristics of a chain link so that there is no doubt as to when the chain or chain link should be removed from service. The invention includes a device having therein a plurality of slots each accompanied by a unique designation which indicates the nominal size of the chain which that particular slot is intended to measure. Each of the slots has an opening smaller than the identified chain size and which is preferably equal to the minimum acceptable link section size whereby links fitting into said openings are positively determined to equal or exceed the wear criteria established for the chain by the chain manufacturer. While it will be recognized that these values may differ for different types of chains, an illustrative slot may have an opening substantially equal to seventy-two percent of the nominal chain size.

In order to produce a compact device, the inspection gauge may be formed in a manner which places a smaller slot in the bottom of a larger slot in a cascading array so that each separate slot is set off by a shoulder on one side. Furthermore, the apparatus is formed so that each of the slots projects into the body parallel to an edge of the body with a spacing from the edge of the body not greater than the smallest inside width of the chain link to be measured by that particular slot. Each slot has a depth from top to bottom which is adapted to receive therein the chain link to be measured.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

SUMMARY OF BRIEF DESCRIPTION OF EMBODIMENTS

Figure 1:
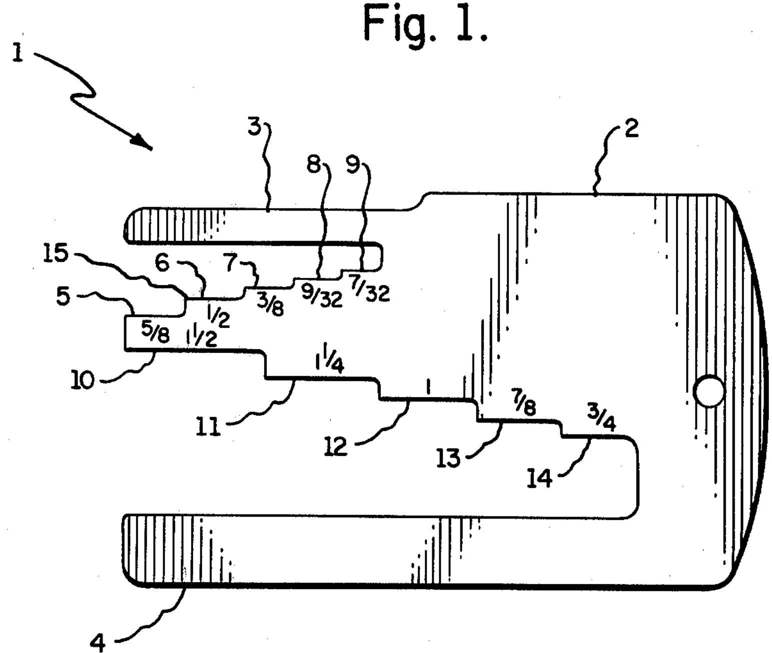
FIG. 1 is an illustration of one embodiment of the chain wear inspection apparatus of the present invention and FIG. 2 is a second embodiment of the chain wear inspection apparatus ofthe present invention.

While the invention is susceptible of various modifications and alternative constructions, there is shown in the drawings and there will hereinafter be described, in detail, a description of the preferred embodiment. It is to be understood however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

Referring now to FIG. 1, the chain wear inspection gauge is generally illustrated by numeral 1. The gauge consists of a body 2 of sheet material, preferably metallic in nature, which includes side edges 3 and 4. Measuring slots 5 and 10, for example, project into the body 2 of the gauge from one end or from opposite ends thereof. The slots 5 and 10 run parallel to the external edges 3 and 4 respectively and are separated therefrom by a distance which is no greater than the smallest diameter of the inside width of the chain link to be measured. Each of the measuring slots has a depth adapted to receive therein one of the links of the particular chain to be measured.

As shown, a slot 6 may desirably be formed in the bottom of slot 5 to extend inwardly therefrom with a separating shoulder therebetween as indicated by numeral 15. In a similar manner, additional slots 7, 8 and 9 may extend in cascade style from the bottom of each of the larger slots so that a compact concatenation of measuring slots is achieved. A similar arrangement may exist with respect to slots 10, 11, 12, 13 and 14 as shown.

As can be seen from the FIGURES, each of the individual slots is accompanied by a unique indicium designating the nominal chain wire size of the chain which each particular slot is intended to measure. For example, slot 5 is designated as the slot appropriate for measuring a $\frac{5}{8}$ inch chain. In accordance with the present invention, the opening of each of the measuring slots 5 throgh 14 is less than indicated nominal size as set forth by the unique indicium adjacent thereto. With this arrangement, an unworn or only slightly worn chain link is not permitted to slide into the approprite slot as indicated by the indicium. The link's inability to slide into the corresponding slot indicates that the link is well within the margin of safety specified by the manufacturer of the chain.

When a chain link has been worn to a degree that the link, as measured at any portion of the link, slides into the slot indicated as appropriate for that chain size, a positive indication that the chain has been worn to a degree which requires replacement is generated. In a preferred form, the slot opening is substantially equal to 72 percent of the indicated nominal wire size. It will be recognized, however, that this percentage will vary depending upon the strength of the material from which the chain has been fabricated, and on the prevailing safethy factors felt to be applicable in the particular industrial use.

Figure 2:
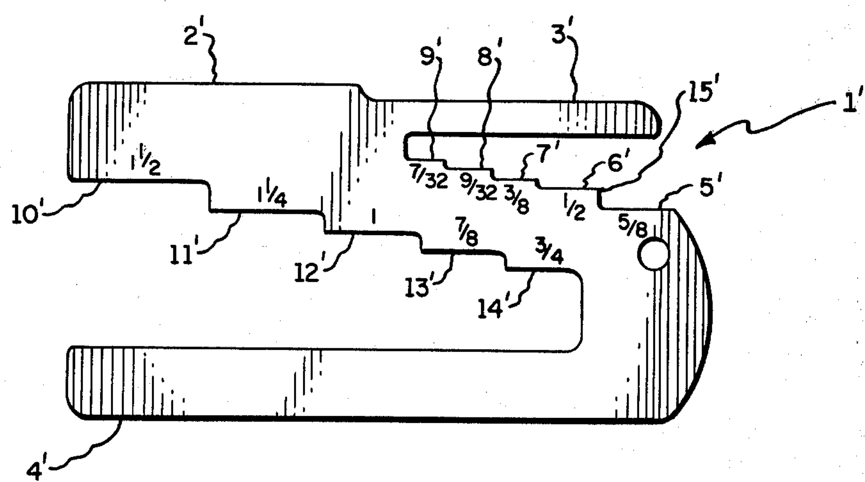

Turning now to FIG. 2, it can be seen that the structures of the embodiment of FIG. 2 are similar to those shown in FIG. 1 and are designated by primed reference numerals.

What is claimed is:

1. A chain wear inspection device having link receiving slots therein for measuring the section thickness of a closed loop link of a standard bent wire link type chain, said inspection device having a flat body formed of sheet material with at least one side forming a straight edge, characterized in that said device includes slot identifying indicia adjacent to each slot for uniquely identifying each slot with the chain size to be measured, each of said slots having an opening smaller than said identified chain size by an amount equal to the limit of permissible wear whereby links fitting into said opening are determined to be worn beyond the acceptable limit, at least one of said slots extending inwardly into said device from the bottom of a larger slot having a larger opening than said one slot, said one slot being delimited by a shoulder intermediate said one slot and said larger slot and each of said slots being formed with one side parallel to said straight edge with a spacing from said straight edge not greater than the inside width of the standard chain link to be measured by said one slot.

2. The inspection device as recited in claim 1 characterized in that each of said slots has an opening of approximately seventy-two percent of the chain nominal size.

* * * * *